ered liquor is neutral, or nearly so, pressed,

UNITED STATES PATENT OFFICE.

THEODOR REISSIG, OF LUDWIGSHAFEN-ON-THE-RHINE, BAVARIA, ASSIGNOR TO THE BADISCHE ANILIN AND SODA FABRIK, OF MANNHEIM, GERMANY.

BLUE DYE.

SPECIFICATION forming part of Letters Patent No. 431,541, dated July 1, 1890.

Application filed August 23, 1889. Serial No. 321,785. (Specimens.) Patented in Germany February 28, 1888, No. 45,268; in England March 23, 1888, No. 4,476, and in France May 16, 1888, No. 189,359.

*To all whom it may concern:*

Be it known that I, THEODOR REISSIG, a subject of the Grand Duke of Hesse, residing at Ludwigshafen-on-the-Rhine, in the Kingdom of Bavaria and Empire of Germany, have invented new and useful Improvements in the Manufacture of a Blue Coloring-Matter, (for which I have obtained Letters Patent in Germany, No. 45,268, dated February 28, 1888; in Great Britain, No. 4,476, dated March 23, 1888, and in France, No. 189,359, dated May 16, 1888,) of which the following is a specification.

My invention relates to the manufacture of a blue coloring-matter or dye-stuff produced by the condensation of alpha-naphthylamine with the mononitroso compound of diethyl-meta-amidophenol.

In carrying out my invention I mix about ten parts, by weight, of hydrochlorate of alphanaphthylamine with about sixty parts, by weight, of acetic acid, containing about sixty-six per cent. of monohydrated or glacial acetic acid. The mixture thus produced is then heated up to about 60° centigrade in an enameled vessel provided with an agitator and fitted up within a water bath, and under constant agitation about ten parts, by weight, of hydrochlorate of nitroso-diethyl-meta-amidophenol are gradually added. The temperature of the mixture is then raised to about 100° centigrade, and maintained thereat for, say, about three hours, or until the blue color, thus gradually developed, does no longer appear to increase in intensity. The contents of the vessel are then allowed to cool down to about 30° centigrade, and are afterward intimately mixed with about twenty parts, by weight, of water. The coloring-matter thus precipitated is then collected upon a filter and washed with cold water. A further purification may be effected by boiling the coloring-matter with about one hundred parts, by weight, of water, allowing the mixture to cool down to about 60° centigrade, filtering, pressing, and drying the product thus obtained.

In the manner hereinbefore described the coloring-matter is obtained in the state of a hydrochlorate sparingly soluble in water, and on this account less suitable for dyeing and printing than the corresponding sulphate, which possesses a superior degree of solubility, and may be conveniently prepared by dissolving the said hydrochlorate in about eight times its own weight of concentrated and gently-warmed sulphuric acid. The solution thus obtained is allowed to cool and poured into about seven or eight times its own weight of cold water, whereby the coloring-matter is precipitated in the state of a sulphate, which, upon continued agitation, assumes a crystalline appearance. The product thus obtained is then collected upon a filter, washed with a cold solution of Glauber's salt until the filtered liquor is neutral, or nearly so, pressed, and dried.

My blue coloring-matter or dye-stuff, produced as above described, presents the following characteristic properties: It is a basic coloring-matter. Prepared in the state of the hereinbefore-mentioned hydrochlorate or sulphate it presents the appearance of a dark crystalline bronze-like powder, soluble in alcohol with a splendid blue color. The solution in concentrated sulphuric acid possesses a bright red color, which, upon the addition of water, turns blue. By adding caustic alkali to an aqueous solution of the above-named sulphate a precipitate is produced consisting of the free base of the coloring-matter, soluble in sulphuric ether with a yellow color and in alcohol with a red color. The ethereal solution exhibits a yellow fluorescence. Upon being fused with caustic soda the coloring-matter suffers decomposition, and the characteristic smell of alpha-naphthylamine becomes plainly perceptible.

If the alcoholic solution of my coloring-matter be boiled with zinc-dust and caustic soda, a nearly colorless solution of the corresponding leuco base results, which, upon the access of air, rapidly reassumes the red color characteristic of the free coloring-base, as hereinbefore described. In a similar manner the alcoholic and acidified solution of the coloring-matter is decolorized by the reducing action of stannous chloride. The hydrochlorate of the leuco compound thus produced is more permanent in the presence of air than the above-named leuco base; but upon the addition of an oxidizing agent—such, for instance, as ferric chloride—the original blue color of the dye-stuff immediately reappears.

My blue coloring-matter or dye-stuff dyes animal fibers in a neutral or slightly-acidulated dye-bath without the aid of a mordant, and may be fixed upon vegetable fibers by means of a tannin mordant. The shades thus produced in dyeing and printing are very bright and similar to those of methylene-blue.

What I claim as new, and desire to secure by Letters Patent, is—

As a new product, the blue coloring-matter or dye-stuff hereinbefore described, produced by the condensation of alpha-naphthylamine with the mononitroso compound of diethyl-meta-amidophenol, and having the following characteristics: It appears under the form of a dark crystalline bronze-like powder, soluble both in water and alcohol with a blue color, the alcoholic solution turning red upon the addition of caustic alkali and becoming decolorized by subsequent heating with zinc-dust, but quickly reassuming its red color upon the access of air, while the aqueous solution of the coloring-matter is precipitated by caustic alkalies, such precipitate consisting of the free coloring-base, being soluble in sulphuric ether with a yellow color and a yellow fluorescence, and it produces upon animal fibers, without the aid of a mordant in a neutral or slightly-acid bath, and upon vegetable fibers, with the aid of a tannin mordant, bright blue shades similar to those of methylene-blue.

In testimony whereof I have hereunto set my hand in the presence of two subscribing witnesses.

THEODOR REISSIG.

Witnesses:
HERMANN KAUTZ,
FERDINAND PFEIFFER.